US007917516B2

United States Patent
Loofbourrow et al.

(10) Patent No.: US 7,917,516 B2
(45) Date of Patent: Mar. 29, 2011

(54) UPDATING AN INVERTED INDEX

(75) Inventors: Wayne Loofbourrow, San Jose, CA (US); John Martin Hoernkvist, Cupertino, CA (US); Eric Richard Koebler, Aptos, CA (US); Yun-chih S. Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 11/760,680

(22) Filed: Jun. 8, 2007

(65) Prior Publication Data
US 2008/0307013 A1  Dec. 11, 2008

(51) Int. Cl.
G06F 17/30 (2006.01)
(52) U.S. Cl. .................. 707/741; 707/742; 707/705
(58) Field of Classification Search .............. 707/1–3, 707/202, 204, 741, 742, 705
See application file for complete search history.

(56) References Cited

U.S. PATENT DOCUMENTS

| 5,685,003 | A | * | 11/1997 | Peltonen et al. | 707/3 |
| 5,761,688 | A | * | 6/1998 | Morishita | 707/E17.037 |
| 5,915,249 | A | * | 6/1999 | Spencer | 707/5 |
| 6,067,541 | A | | 5/2000 | Raju et al. | |
| 6,073,144 | A | * | 6/2000 | van Hoff | 707/101 |
| 6,349,308 | B1 | * | 2/2002 | Whang et al. | 707/1 |
| 7,162,473 | B2 | | 1/2007 | Dumais et al. | |
| 2001/0049675 | A1 | * | 12/2001 | Mandler et al. | 707/1 |
| 2004/0117374 | A1 | | 6/2004 | Hung et al. | |
| 2004/0177057 | A1 | | 9/2004 | Fairchild et al. | |
| 2004/0205044 | A1 | * | 10/2004 | Su et al. | 707/2 |
| 2006/0106792 | A1 | * | 5/2006 | Patterson | 707/5 |

FOREIGN PATENT DOCUMENTS

WO    WO 03/060774 A1    7/2003

OTHER PUBLICATIONS

Efficient Search in Large Textual Collections with Redundancy by Jiangong Zhang and Torsten Suel CIS Department Polytechnic University Brooklyn, NY 11201, WWW 2007, May 8-12, 2007, Banff, Alberta, Canada. ACM 978159593654—7/ 07/0005.*

* cited by examiner

*Primary Examiner* — Mohammad Ali
*Assistant Examiner* — Thuy (Tiffany) Bui
(74) *Attorney, Agent, or Firm* — Blakely, Sokoloff, Taylor & Zafman LLP

(57) ABSTRACT

Systems and methods for processing an index are described. To insure that the most updated index is available without having to update the index after every change (which can consume enormous resources), a specially marked postings list is generated for a changed item. During retrieval, the specially marked postings list supplements the existing content of an inverted index referencing the changed item. In this manner, the retrieval result for items containing the term under which the changed item was originally indexed is updated in accordance with the specially marked postings list to insure the most accurate retrieval result.

21 Claims, 6 Drawing Sheets

UPDATING AN INVERTED INDEX

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching not only the content of a file, but also by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. This search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. Some file management systems, such as the Finder program, allow users to find a file by searching through the metadata.

In a typical system, the various content, file, and metadata are indexed for later retrieval using a program such as the Finder program, in what is commonly referred to as an inverted index. For example, an inverted index might contain a list of references to documents in which a particular word appears. Given the large numbers of words and documents in which the words may appear, an inverted index can be extremely large. The size of an index presents many challenges in processing and storing the index, such as updating the index or using the index to perform a search.

SUMMARY OF THE DETAILED DESCRIPTION

Methods and systems for processing an inverted index in a data processing system are described herein.

According to one aspect of the invention, a method for updating an index is described in which a specially marked postings list is generated to reflect changes in indexed items. The specially marked postings list functions as a delta that contains changes to the existing content of an index that may be resolved during retrieval of items from the index, i.e., during a search. In this manner, the difficult and time consuming task of updating the existing content in an index may be deferred until a later time while still insuring that the latest changes are reflected in the index during retrieval. Moreover, the specially marked postings lists are encoded such that they may be stored in another index (e.g., a live index rather than a scanned index) than the index to which they apply, and the updates may be resolved at search time. Typically, the changes to the item for which the specially marked postings list is most useful are changes to the metadata of the item.

BRIEF DESCRIPTION OF THE DRAWINGS

The present invention is illustrated by way of example and not limitation in the figures of the accompanying drawings in which like references indicate similar elements.

DETAILED DESCRIPTION

The embodiments of the present invention will be described with reference to numerous details set forth below, and the accompanying drawings will illustrate the described embodiments. As such, the following description and drawings are illustrative of embodiments of the present invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 1:
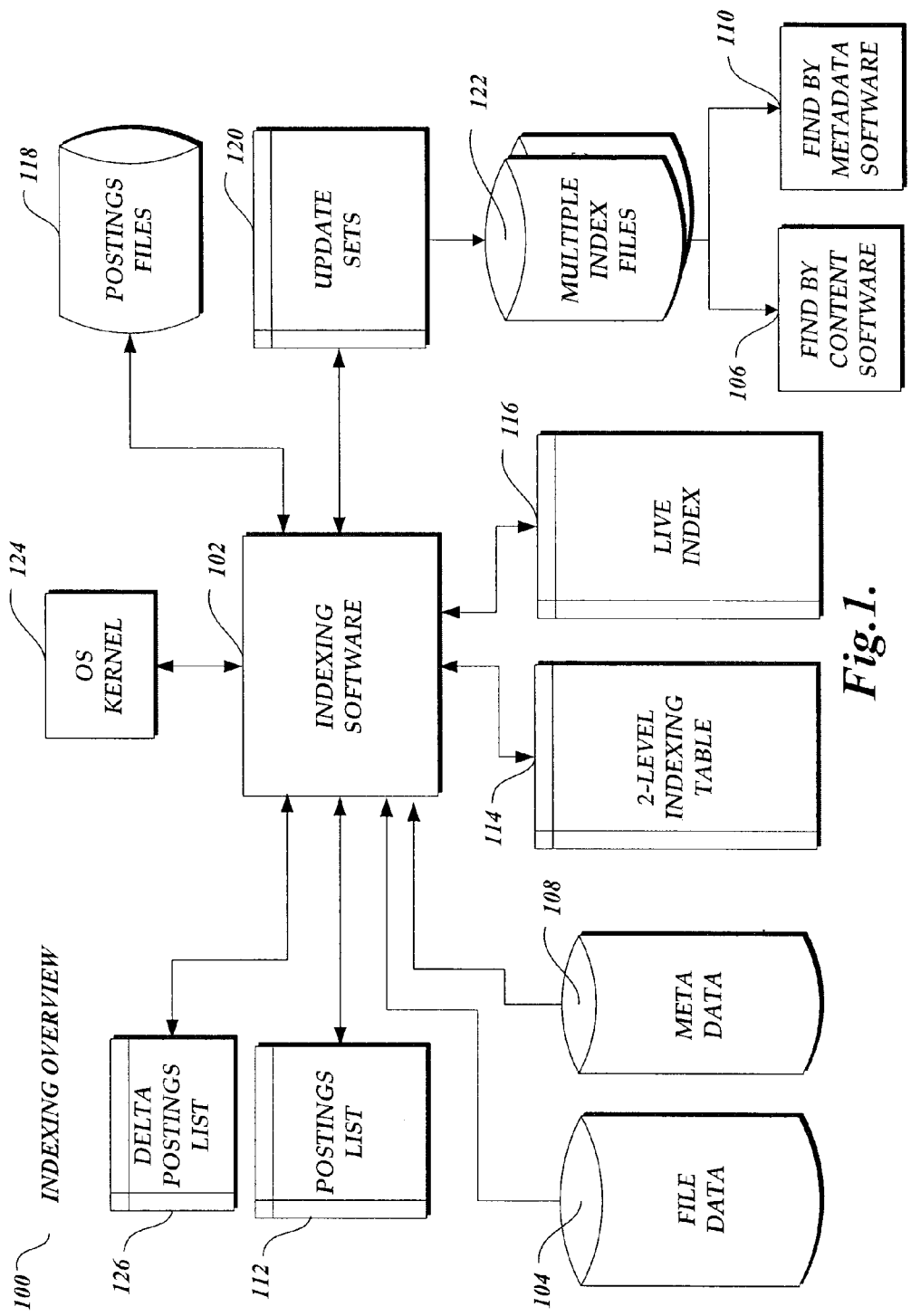
FIG. 1 is a block diagram overview of an architecture for processing an inverted index according to one exemplary embodiment of the invention.
Figure 5:
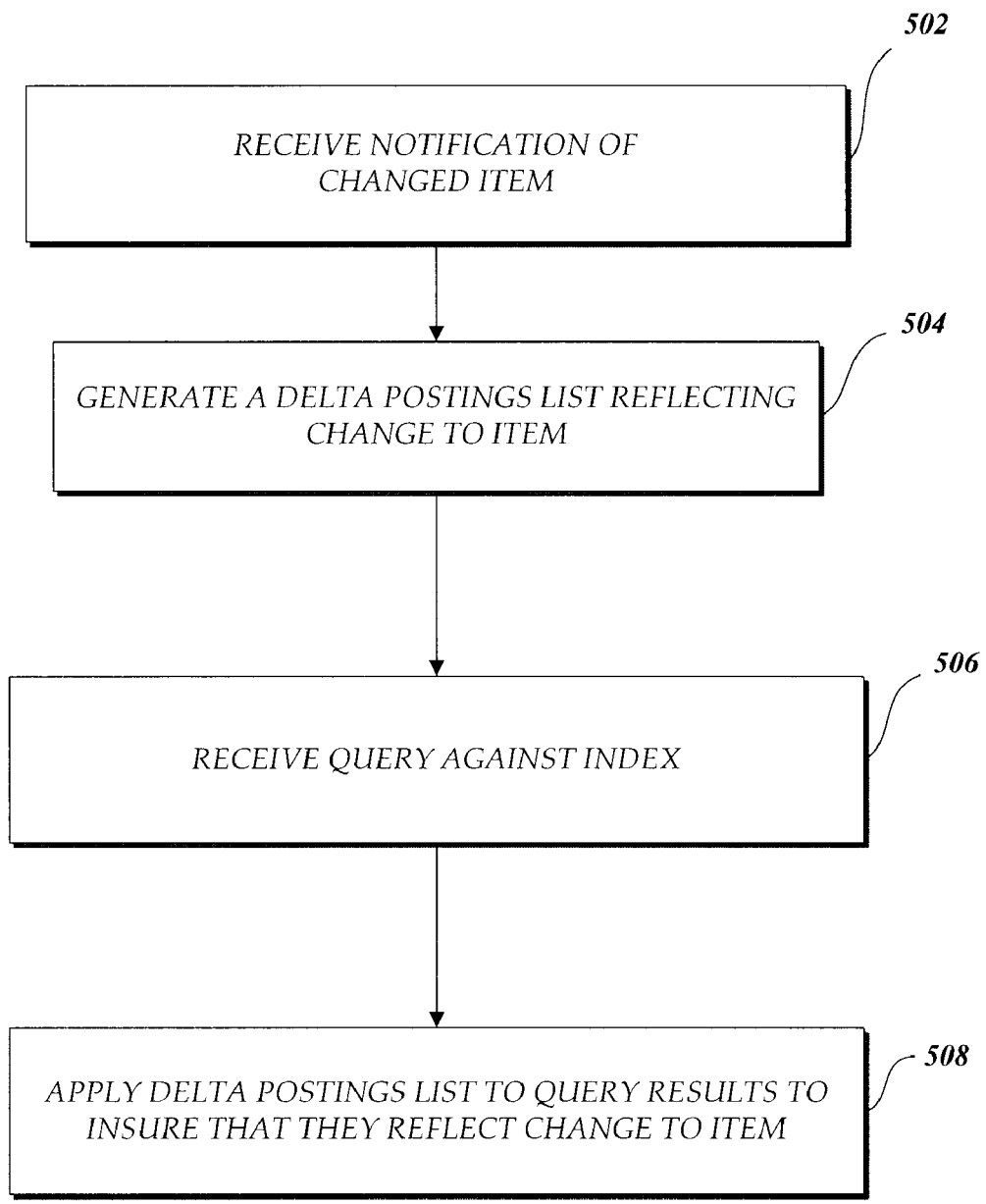
FIG. 5 is a flow diagram illustrating certain aspects of performing a method of processing updates to an index according to one exemplary embodiment of the invention.

Various different software architectures may be used to implement the functions and operations described herein, such as to perform the method shown in FIG. 5. The following discussion provides one example of such an architecture, but it will be understood that alternative architectures may also be employed to achieve the same or similar results. The software architecture 100 shown in FIG. 1 is an example which is based upon the Macintosh operating system. The architecture 100 includes indexing software 102 and an operating system (OS) kernel 124 which is operatively coupled to the indexing software 102, as well as other software programs, such as find by content software 106 and find by metadata software 110 (which may be the Finder program referenced earlier), and other applications not shown.

In one exemplary embodiment, the find by content software 106 and/or the find by metadata software 110 is used to find a term present in the file data 104 or meta data 108. For example, the software 106/110 may be used to find text and other information from word processing or text processing files created by word processing programs such as Microsoft Word, etc.

The find by content software 106 and find by metadata software 110 are operatively coupled to databases which include one or more indexes 122. The indexes 122 represent at least a subset of the data files in a storage device, including file data 104 and meta data 108, and may include all of the data files in a particular storage device (or several storage devices), such as the main hard drive of a computer system. The one or more indexes 122 comprise an indexed representation of the content and/or metadata of each item stored on the data files 104/108, such as a text document, music, video, or other type of file. The find by content software 106 searches for a term in that content by searching through the one or more index files 122 to see if the particular term, e.g., a particular word, is present in items stored on data files 104 which have been indexed. The find by content software functionality is available through find by metadata software 110 which provides the advantage to the user that the user can search the indexes 122 for the content 104 within an item stored on the data files 104 as well as any metadata 108 that may have been generated for the item.

In one embodiment of the present invention, indexing software 102 is used to create and maintain the one or more indexes 122 that are operatively coupled to the find by content and metadata software applications 106/110. Among other functions, the indexing software 102 receives information obtained by scanning the file data 104 and meta data 108, and uses that information to generate a postings list 112 that identifies an item containing a particular term, or having metadata containing a particular term. As such, the postings list 112 is a type of inverted index that maps a term, such as a search term, to the items identified in the list. In a typical embodiment, the information obtained during the scan includes a unique identifier that uniquely identifies the item containing the particular term, or having metadata containing the term. For example, items such as a word processing or text processing file have unique identifiers, referred to as ITEMIDs. The ITEMIDs are used when generating the postings list 112 to identify those items that contain a particular term, such as the word "Apple." ITEMIDs identifying other types of files, such as image files or music files, may also be posted to the postings list 112, in which case the ITEMID typically identifies items having metadata containing a particular term.

In one embodiment, the indexing software 102 accumulates postings lists 112 for one or more terms into one or more update sets 120 and, from time to time, flushes the updates sets 120 into one or more index files 122. The postings lists 112 for one or more items may also be stored in a postings file 118. The indexing software 102 may employ one or more indexing tables 114 that comprise one or more term tables, including a two-level table that separates the more frequently occurring terms from the less frequently occurring terms. The tables 114 may also include a postings table that comprises one or more postings lists for the terms that are being indexed. In one embodiment, the indexing software may maintain a live index 116 to contain the most current index. In some cases, updates to an index may be generated in a delta postings list 126 that is a specially marked postings list that may be dynamically applied to an index 122, postings files 118, updates sets 120, or other forms of an index in order to insure that the most current information is returned whenever those indexes are accessed.

Figure 2:
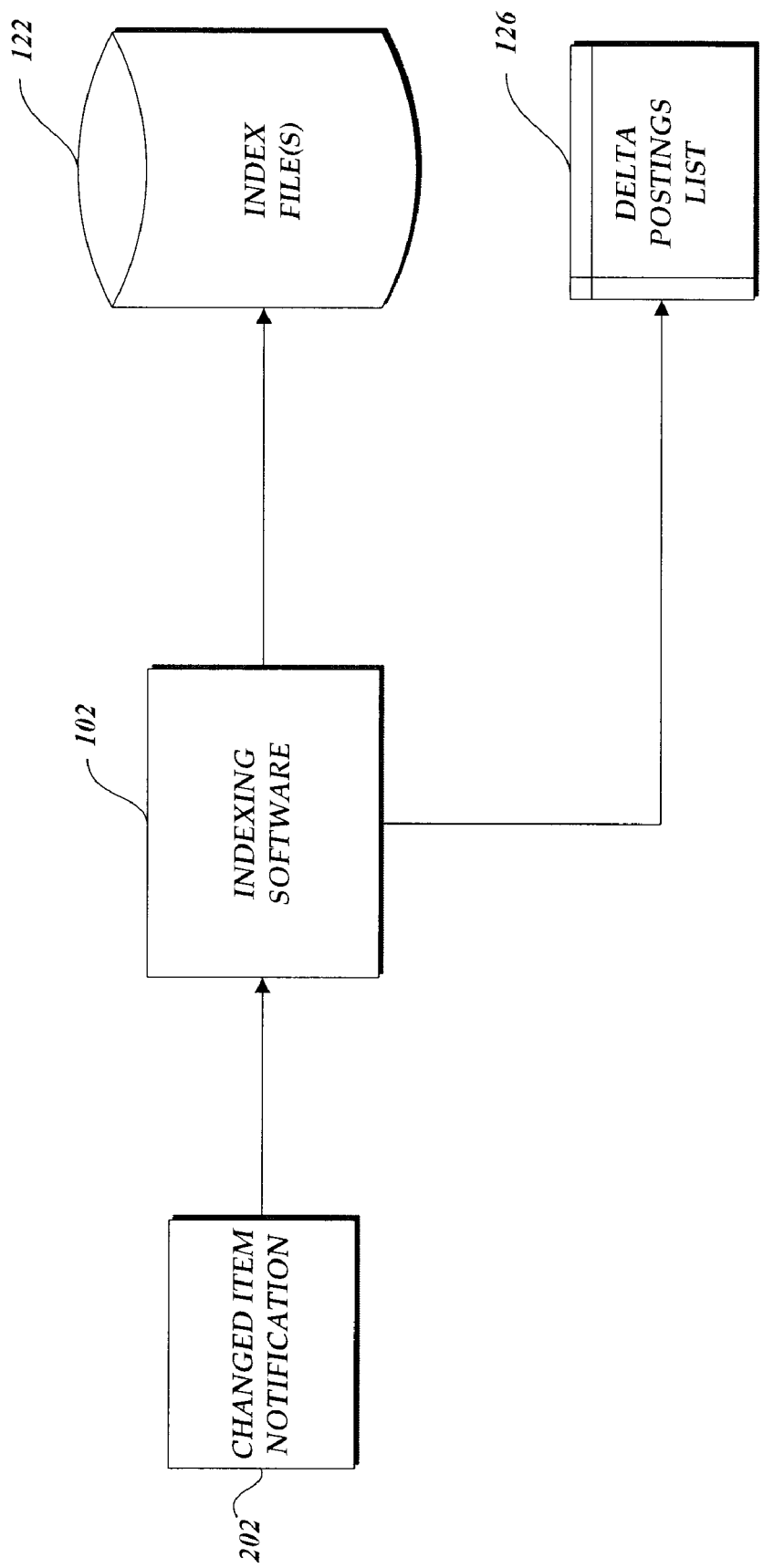
FIG. 2 is a block diagram illustrating one aspect of processing updates to an index according to one exemplary embodiment of the invention.

FIG. 2 is a block diagram illustrating one aspect of processing updates to an index according to one exemplary embodiment of the invention. Updating existing content of an inverted index is very difficult and time consuming, especially when the inverted index is stored on a storage medium, as is typically the case. For example, existing content of an inverted index might include an existing postings list for the word "apple" that identifies all of the documents that contain the word "apple." Should one of the documents be updated to change the word "apple" to the word "pear," then the existing postings list that identified that document as containing the word "apple," is no longer accurate and must somehow be updated to remove the reference to that document. As described below, this may be accomplished through the use of a specially marked postings list that functions as a delta for temporarily updating the existing content of the inverted index.

As shown in FIG. 2, indexing software 102 receives a changed item notification 202 indicating that an item that has been indexed has changed so that the a representation of the changed item in the index files 122 is no longer accurate. The indexing software 202 generates a delta postings list 126 that contains a specially marked postings list to reflect the change to the item.

Figure 3:
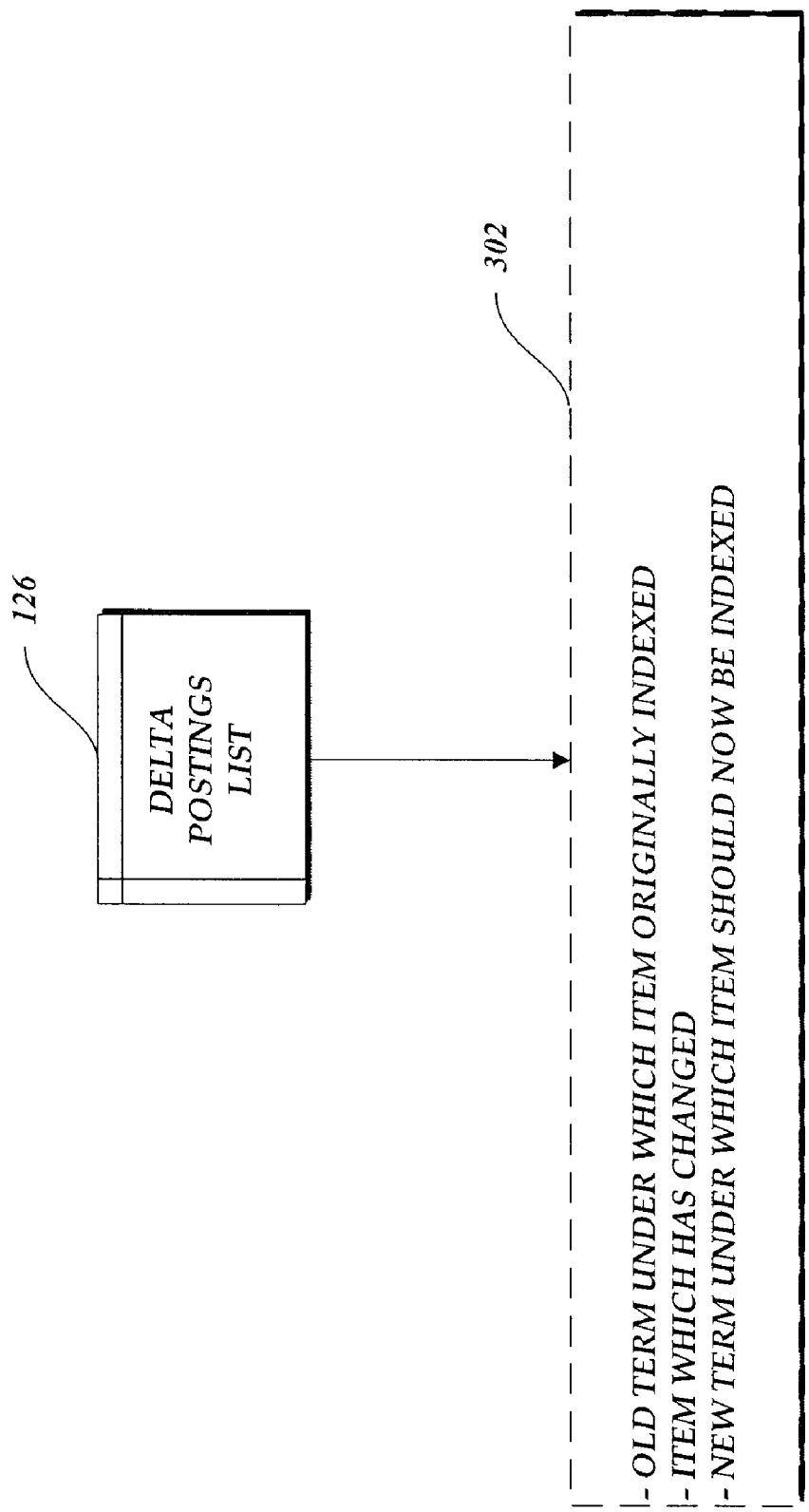
FIG. 3 is a block diagram illustrating another aspect of processing updates to an index according to one exemplary embodiment of the invention.

As shown in FIG. 3, the specially marked postings list 126 may include, among other things, a reference to the item that changed and a reference to the term under which the item was originally indexed. The existing content of an inverted index referencing the changed item may include any existing postings list referencing the term under which the item was originally indexed. If there is no existing postings list, i.e., if this is the first time the term has been referenced in an item, then an update set comprising a regular postings list is created rather than a specially marked postings list. The specially marked postings list 126 may also include, among other things, a reference to the item that changed and a reference to the term under which the item should now be indexed. The existing content of an inverted index referencing the changed item may include any existing postings list referencing the term under which the item should now be indexed.

Figure 4:
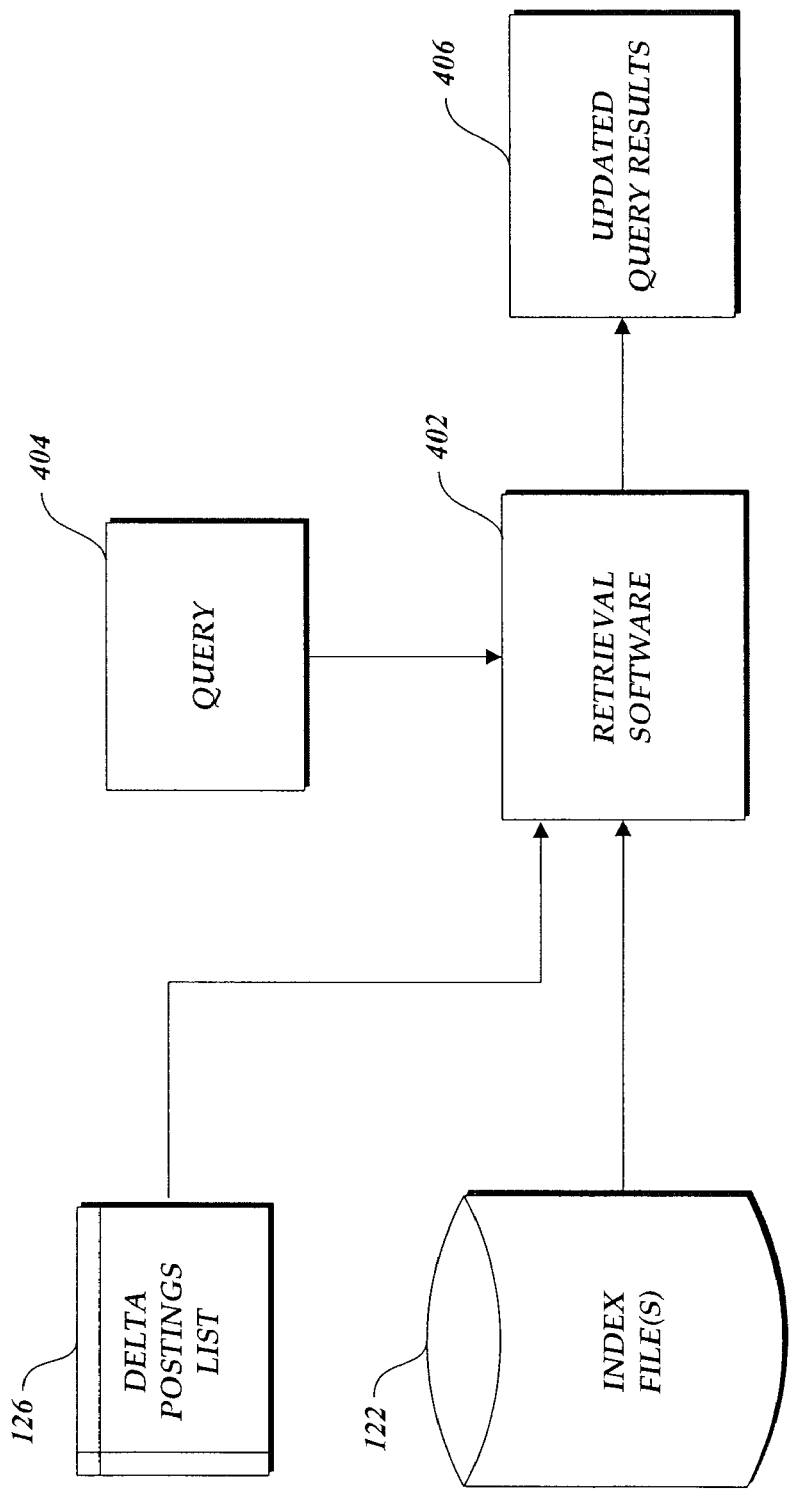
FIG. 4 is a block diagram illustrating yet another aspect of processing updates to an index according to one exemplary embodiment of the invention.

As shown in FIG. 4, a retrieval software 402 is operatively coupled to the delta postings list 126. Upon receiving a query 404 against an index file 122 that may not accurately reflect the changes to items because the items were indexed prior to being changed, the retrieval software 402 interrogates the specially marked postings list contain in the delta 126 to determine whether updates are available. If updated information is available, the retrieval software 402 supplements the existing content of the index with the updated information, and generates the results of the query 406 to reflect the changes documented in the delta postings list 126. It should be noted that the delta postings list may be associated with one or more inverted indexes 122 having existing content that no longer accurately represents items that changed after the index 122 was created or last updated. In addition, the delta postings list 126 may be stored in the inverted index 122 to which it applies, but can also be stored elsewhere and simply associated with the inverted index (or indexes) 122 to which it applies.

FIG. 5 is a flow diagram illustrating certain aspects of performing a method of updating an index according to one exemplary embodiment of the invention. In FIG. 5, the method to be performed begins at block 502, in which an indexing software receives a notification that an item that was previously indexed has been changed. Processing continues at block 504, in which the indexing software generates a delta postings list that reflects the changes to the item. The delta postings list is associated with one or more indexes that may need to be updated with the changed information. At block 506, a retrieval software receives a query against an index that may be out of date. At block 508, the retrieval software determines whether a delta postings list is available, and if so applies the delta postings list to the query results to insure that they reflect the latest changes to the item. In a typical embodiment, the retrieval software supplements the existing content of the index with the updated information in the delta postings list, and generates the query result from the supplemented existing content of the index to reflect the updated information.

Figure 6:
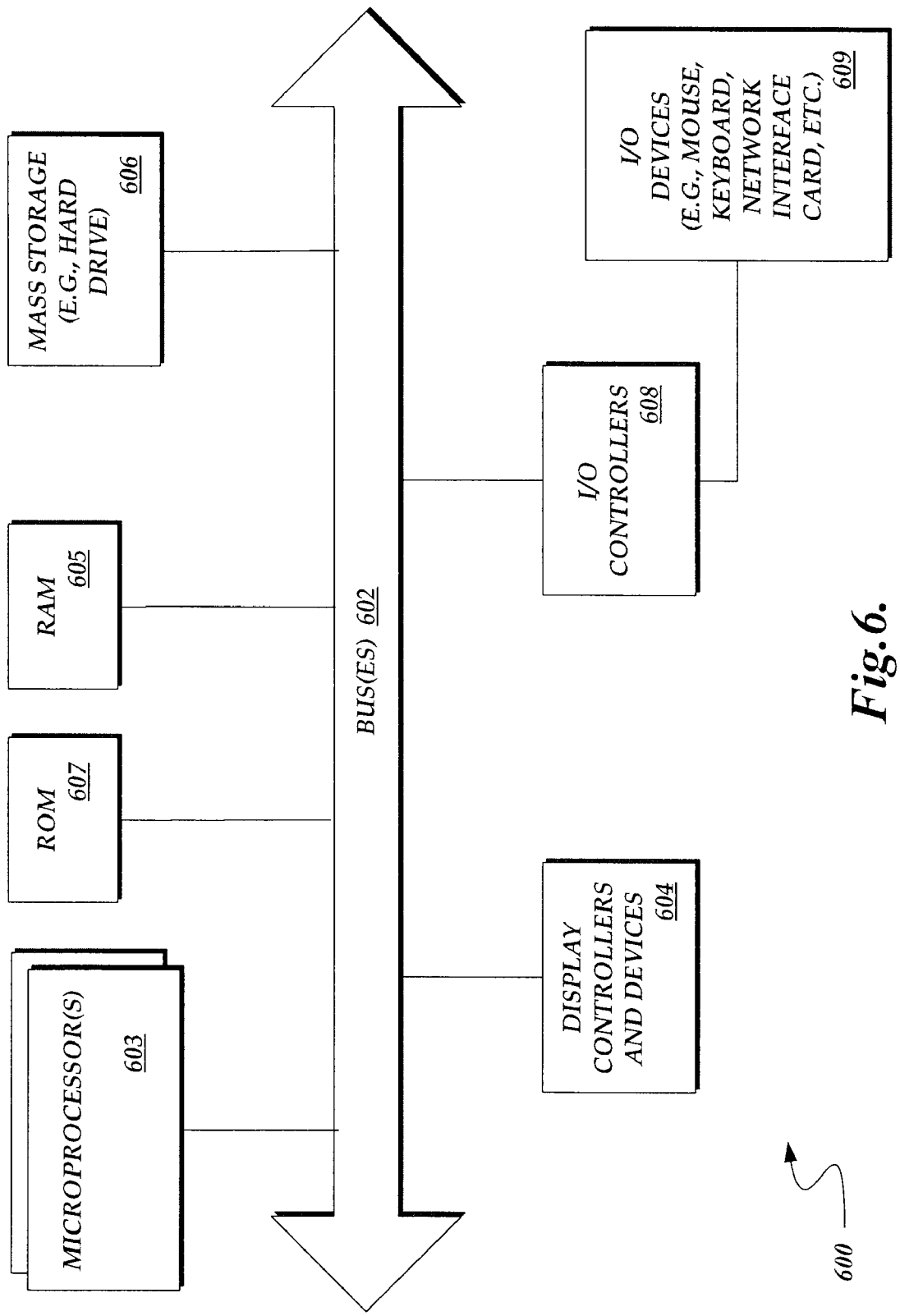
FIG. 6 is a block diagram overview of an exemplary embodiment of a data processing system, which may be a general purpose computer system and which may operate in any of the various methods described herein.

FIG. 6 illustrates an example of a typical computer system which may be used with the present invention. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 6 may, for example, be a Macintosh computer from Apple Computer, Inc.

As shown in FIG. 6, the computer system 600, which is a form of a data processing system, includes a bus 602 which is coupled to a microprocessor(s) 603 and a ROM (Read Only Memory) 607 and volatile RAM 605 and a non-volatile memory 606. The microprocessor 603 may be a G3 or G4 microprocessor from Motorola, Inc. or one or more G5 microprocessors from IBM. The bus 602 interconnects these various components together and also interconnects these components 603, 607, 605, and 606 to a display controller and display device 604 and to peripheral devices such as input/output (I/O) devices which may be mice, keyboards, modems, network interfaces, printers and other devices which are well known in the art. Typically, the input/output devices 609 are coupled to the system through input/output controllers 608. The volatile RAM (Random Access Memory) 605 is typically implemented as dynamic RAM (DRAM) which requires power continually in order to refresh or maintain the data in the memory. The mass storage 606 is typically a magnetic hard drive or a magnetic optical drive or an optical drive or a DVD RAM or other types of memory systems which maintain data (e.g. large amounts of data) even after power is removed from the system. Typically, the mass storage 606 will also be a random access memory although this is not required. While FIG. 6 shows that the mass storage 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as is well known in the art. In one embodiment the I/0 controller 608 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 607, RAM 605, mass storage 606 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 603.

What is claimed is:

1. A machine implemented method of updating an inverted index, the method comprising:

receiving a notification of a changed item and in response to receiving the notification, updating a list of postings to reflect the changed item, wherein a posting of a change to the item is generated in the list of postings;

in response to receiving a query for an item indexed in the inverted index, generating a query result of the query from the inverted index, wherein an existing content for the item in the inverted index does not accurately represent the item;

interrogating the list of postings separate from the inverted index to determine if the change to the item indexed in the inverted index has occurred, the list of postings to represent changes having occurred to items indexed in the inverted index without having to immediately update the inverted index after the changes;

if the change has occurred, applying the list of postings to the query result to reflect the change to the item, the list of postings supplementing the inverted index for the query result; and retrieving the item in accordance with the existing content of the inverted index supplemented with the posting of the change to the item, wherein the change to the item is applied prior to the retrieval and wherein the retrieved item is presented on a display device or the machine.

2. The method of claim 1, wherein the existing content contains a term under which the item was originally indexed, and wherein the posting of the change includes the term under which the item was originally indexed.

3. The method of claim 2, wherein the posting of the change includes a new term under which the item should now be indexed.

4. The method of claim 3, wherein the change to the item comprises a term deleted from the item, and generating the posting of the change to the item comprises posting data representing:

the item that changed; and the term deleted from the item.

5. The method of claim 3, wherein the change to the item comprises a term added to the item, and generating the posting of the change to the item comprises posting data representing:

the item that changed; and the term added to the item.

6. A machine implemented method of updating an inverted index, the method comprising:
   receiving a notification of a changed item;
   generating, in response to the notification, a posting representing a change of an item, the posting being separate from the inverted index which indexed the item prior to the change, wherein an existing content for the item in the inverted index does not accurately represent the item with the change, the posting to allow accurate retrieval for the item without updating immediately the inverted index with the change;
   storing the posting in a delta list associated with the items no longer accurately represented in the inverted index;
   in response to receiving a query, generating a query result against the inverted index including the existing content for the item;
   interrogating the delta list to determine if an update of the inverted index is available;
   applying the posting to the generated query result for a query result reflecting the change of the item based on the interrogation which determines the update of the inverted index is available; and
   retrieving the item in accordance with the query result reflecting the change of the item, wherein the retrieved item is presented on a display device of the machine.

7. The method of claim 6, wherein the inverted index includes a two-level table that separates more frequently occurring terms form less frequently occurring terms.

8. The method of claim 7, wherein the inverted index includes a live index for a most current index.

9. The method of claim 6, wherein an old term of the item is changed to a new term, wherein the posting indicates the item is indexed under the old term in the inverted index.

10. The method of claim 9, wherein the posting indicates the item should be indexed under the new term.

11. A machine-readable storage medium having instructions, when executed by a machine, cause the machine to perform a method comprising:
    receiving a notification of a changed item and in response to the receiving the notification, updating a list of postings to reflect the changed item, wherein a posting of a change to the item is generated in the list of postings;
    in response to receiving a query for an item indexed in the inverted index, generating a query result of the query from the inverted index, wherein an existing content for the item in the inverted index does not accurately represent the item;
    interrogating the list of postings to determine if the change to the item indexed in an inverted index has occurred, the list of postings to represent changes having occurred to items indexed in the inverted index without having to immediately update the inverted index after the changes;
    if the change has occurred, applying the list of postings to the query result to reflect the change to the item, the list of postings supplementing the inverted index for the query result; and
    retrieving the item in accordance with the existing content of the inverted index supplemented with the posting of the change to the item, wherein the change to the item is applied prior to the retrieval.

12. The storage medium of claim 11, wherein the existing content contains a term under which the item was originally indexed, and wherein the posting of the change includes the term under which the item was originally indexed.

13. The storage medium of claim 12, wherein the posting of the change includes a new term under which the should now be indexed.

14. The storage medium of claim 13, wherein the change to the item comprises a term deleted from the item, and generating the posting of the change to the item comprises posting data representing:
    the item that changed; and
    the term deleted from the item.

15. The storage medium of claim 13, wherein the change to the item comprises a term added to the item, and generating the posting of the change to the item comprises posting data representing:
    the item that changed; and
    the term added to the item.

16. A machine-readable storage medium having instructions, when executed by a machine, cause the machine to perform a method comprising:
    receiving a notification of a changed item;
    generating, in response to the notification, a posting representing a change of an item, the posting being separate from an inverted index which indexed the item prior to the change, wherein an existing content for the item in the inverted index does not accurately represent the item with the change, the posting in a storage device to allow accurate retrieval for the item without updating immediately the inverted index with the change;
    storing the posting in a delta list associated with items no longer accurately represented in the inverted list;
    in response to receiving a query, generating a query result against the inverted index including the existing content for the item;
    interrogating the delta list to determine if an update of the inverted index is available;
    applying the posting to the generated query result for a query result reflecting the change of the item based on the interrogation which determines the update of the inverted index is available; and
    retrieving the item in accordance with the query result reflecting the change of the item.

17. The storage medium of claim 16, wherein the inverted index includes a two-level table that separates more frequently occurring terms from less frequently occurring terms.

18. The storage medium of claim 17, wherein the inverted index includes a live index for a most current index.

19. A data processing system, comprising:
    a memory storing executable instructions including an indexing software and a retrieval software;
    a storage device storing data files indexed by an inverted index; and
    a processor coupled to the memory and the storage device, the processor being configured to execute the executable instructions from the memory to:
    receive a notification of a changed file and in response to the notification, update a list of postings to reflect the changed file, wherein a posting of a change to the file is generated in the list of postings;
    in response to receiving a query for a file indexed in the inverted index, generate a query result of the query from the inverted index, wherein an existing content for the file in the inverted index does not accurately represent the file, interrogate the list of postings separate from the inverted index to determine if a change to the file indexed in the inverted index has occurred, the list of postings to represent changes having occurred to the data files indexed in the inverted index without having to update immediately the inverted index after the changes, if the change has occurred, apply the list of postings to the query result to reflect the change to the file, the list of postings supplementing the inverted index for the query result; and retrieve the file in accordance with the existing content of the inverted index supplemented with the posting of the change to the file, wherein the change to the file is applied prior to the retrieval.

20. The data processing system of claim 19, wherein the existing content contains a term under which the file was originally indexed, and wherein the posting of the change includes the term under which the file was originally indexed and a new term under which the item should now be indexed.

21. The data processing system of claim 20, the processor is further configured to execute the executables to:

store the list of postings.

* * * * *

UNITED STATES PATENT AND TRADEMARK OFFICE
CERTIFICATE OF CORRECTION

| | | |
|---|---|---|
| PATENT NO. | : 7,917,516 B2 | |
| APPLICATION NO. | : 11/760680 | |
| DATED | : March 29, 2011 | |
| INVENTOR(S) | : Wayne Loofbourrow et al. | |

It is certified that error appears in the above-identified patent and that said Letters Patent is hereby corrected as shown below:

On the cover page, item (75), in "Inventors", in column 1, line 2, delete "Hoernkvist," and insert -- Hornkvist, --, therefor.

In column 3, line 13, delete "meta data" and insert -- metadata --, therefor.

In column 3, line 22, delete "meta data" and insert -- metadata --, therefor.

In column 3, line 43, delete "meta data" and insert -- metadata --, therefor.

In column 6, line 49, in Claim 1, delete "or" and insert -- of --, therefor.

In column 7, line 14, in Claim 6, after "with" delete "the".

In column 7, line 30, in Claim 7, delete "form" and insert -- from --, therefor.

In column 8, line 2, in Claim 13, delete "should" and insert -- item should --, therefor.

Signed and Sealed this
Twentieth Day of December, 2011

David J. Kappos
*Director of the United States Patent and Trademark Office*